Patented July 27, 1948

2,445,892

UNITED STATES PATENT OFFICE 2,445,892

AMINO FATTY DERIVATIVES

Daniel Swern and Thomas W. Findley, Philadelphia, Pa., assignors to the United States of America as represented by the Secretary of Agriculture No Drawing. Application February 5, 1946, Serial No. 645,696

6 Claims. (Cl. 260—404)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

This invention relates to new compositions of matter. More particularly, it refers to aliphatic compounds in which a hydroxyl group and a substituted or an unsubstituted amino group are attached to adjacent carbon atoms. Still more specifically, it refers to stearic acid and octadecanol-1 substituted on the ninth and tenth carbon atoms by a hydroxyl group and a substituted or an unsubstituted amino group.

Compounds containing both amino and hydroxyl groups are among the most important medicinal substances, since they include some of the most widely applied local anesthetics. Not only are the compounds described in this invention potentially useful as organic medicinals, but due to the presence of highly reactive groups such as hydroxyl, amino, and carboxyl groups, they are valuable intermediates in organic synthesis.

The compounds described in this invention are prepared in good yield by reacting either 9,10-epoxystearic acid or 9,10-epoxyoctadecanol-1 with aqueous ammonia or amines, as shown in equations 1 and 2, respectively:

Equation 1
(Heat)

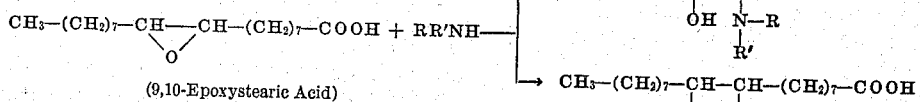

(9,10-Epoxystearic Acid)

Equation 2
(Heat)

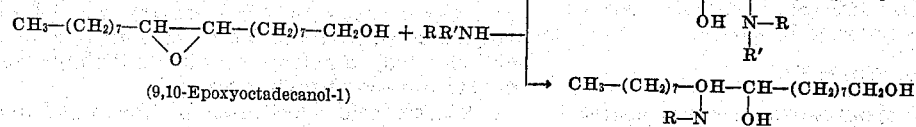

(9,10-Epoxyoctadecanol-1)

where R and R' in either equation is selected from the group consisting of the hydrogen atom, an alkyl radical and an aryl radical.

Since the epoxide ring can open on either side of the oxygen atom, it is believed that two isomeric substances may be formed when the epoxy compound is reacted with ammonia or an amine. However, it is possible that due to steric effects or other causes only one product may be formed, or if two products are formed they may not be formed in equal amounts. The equations shown are only intended to illustrate the types of ring opening reaction which may take place.

The water solubility of some of the amino fatty derivatives prepared by the reaction of 9,10-epoxystearic acid with substituted amines is unusual and unexpected for such long-chain compounds. The N,N-dimethylaminohydroxystearic acids, N-ethylaminohydroxystearic acids and N-methylaminohydroxystearic acids were tested as surface-active agents. These compounds are surface active, reducing the surface tension of water at 20–25° C. to about 33–38 dynes/cm. at pH values of 3–11. These properties are retained to a very large degree in the presence of sodium and calcium chlorides.

The invention is illustrated by the following examples:

Example I 9,10-epoxystearic acid was prepared by the oxidation of oleic acid with perbenzoic acid in acetone solution. By cooling this solution, after the oxidation was complete, 9,10-epoxystearic acid precipitated. This was separated by filtration and was purified by recrystallization from acetone.

6.0 grams of 9,10-epoxystearic acid and 14 ml. of concentrated aqueous ammonia (28% NH₃) was reacted in a sealed tube at 100°–105° C. for 8 hours. The contents of the tube were poured into 204 ml. of N/10 aqueous sodium hydroxide solution and boiled to volatilize the unreacted ammonia. 204 ml. of N/10 aqueous hydrochloric acid was added with stirring. The viscous oil which precipitated changed to a white solid on standing and consisted mainly of aminohydroxystearic acids (6.1 grams). By recrystallization from 95% ethanol, pure aminohydroxystearic acid was obtained.

The product had a melting point of 153.5°–155.5° C. Its neutralization equivalent (Formol titration), calculated at 314.5, was found to be 315. Its carbon content, calculated at 68.5%, was found to be 68.9%. Its hydrogen content, calculated at 11.8%, was found to be 11.7%. Its nitrogen content, calculated at 4.44%, was found to be 4.51%.

Example II

In procedure similar to that of Example I, 6.0 grams of 9,10-epoxystearic acid was reacted with 12.4 grams of a 25% aqueous solution of methylamine.

After acidification, the mixture was evaporated to dryness, and the residue was extracted with absolute alcohol and filtered. Evaporation of the alcohol yielded about 7 grams of a viscous oil which solidified on long standing.

This product consisted mainly of N-methylaminohydroxystearic acids. Its nitrogen content, calculated at 4.25%, was found to be 4.25%.

Example III

In procedure similar to that of Example II, 6.0 grams of 9,10-epoxystearic acid was reacted with 13.7 grams of 33% aqueous solution of ethylamine. A viscous oil (7.3 grams) was obtained which solidified on long standing.

This product consisted mainly of N-ethylaminohydroxystearic acids. Its nitrogen content, calculated at 4.08%, was found to be 4.36%.

Example IV

In procedure similar to that of Example II, 6.0 grams of 9,10-epoxystearic acid was reacted with 13.7 grams of a 33% aqueous solution of dimethylamine. A viscous oil (7.7 grams) was obtained which solidified on long standing.

This product consisted mainly of N,N-dimethylaminohydroxystearic acids. Its nitrogen content, calculated at 4.08%, was found to be 3.67%.

Example V

In procedure similar to that of Example II, 6.0 grams of 9,10-epoxystearic acid was reacted with 21.3 grams of a 33% aqeous solution of diethylamine.

A semi-solid material (7.1 grams), consisting mainly of N,N-diethylaminohydroxystearic acids, was obtained. Its nitrogen content, calculated at 3.76%, was found to be 2.64%.

Example VI 10 grams of 9,10-epoxystearic acid was heated at 95°–100° C. for five hours with 30 ml. of freshly distilled aniline (phenylamine). The excess aniline was removed from the reaction product by steam distillation.

The residue, a viscous, reddish oil (13 grams) consisted mainly of N-phenylaminohydroxystearic acids.

Example VII

To a solution of 25.6 grams of 9,10-epoxyoctadecanol-1 (prepared by reacting oleyl alcohol with perbenzoic acid, as described in the copending application, Serial No. 567,297, filed December 8, 1944) now Patent 2,411,762, in 236 ml. of methanol, 140 ml. of concentrated aqueous ammonia (28% NH₃) was added, and the whole was heated in a sealed tube at 100° to 105° C. for six hours.

At the end of this time, the contents of the tube were removed and evaporated to dryness.

The product, a low-melting solid, weighed 26.3 grams and consisted mainly of aminohydroxyoctadecanols.

Although the reactions described in some of the examples were conducted under pressure in closed systems, this is not an essential part of the invention. It is only necessary to use a closed system when the amine is volatile at the operating temperature required to open the epoxide ring. The conditions of time and temperature may be varied over a wide range to give substantially the same results. The reaction conditions given in the examples are merely intended to be illustrative.

Having thus described the invention, what is claimed is:

1. A process comprising reacting a compound selected from the class consisting of 9,10-epoxystearic acid and 9,10-epoxyoctadecanol-1 with an aqueous compound selected from the class consisting of ammonia, methylamine, ethylamine, dimethylamine, diethylamine and phenylamine to produce a compound selected from the class consisting of stearic acid and octadecanol-1, said produced compound being substituted on the ninth and tenth carbon atoms by a hydroxyl group and a group selected from the class consisting of amino, methylamino, ethylamino, dimethylamino, diethylamino and phenylamino.

2. A process comprising reacting 9,10-epoxystearic acid with an aqueous compound selected from the class consisting of ammonia, methylamine, ethylamine, dimethylamine, diethylamine and phenylamine to produce stearic acid substituted on the ninth and tenth carbon atoms by a hydroxyl group and a group selected from the class consisting of amino, methylamino, ethylamino, dimethylamino, diethylamino and phenylamino.

3. A process comprising reacting 9,10-epoxystearic acid with aqueous dimethylamine to produce stearic acid substituted on the ninth and tenth carbon atoms by a hydroxyl group and a dimethylamino group.

4. A compound selected from the class consisting of stearic acid and octadecanol-1, said compound being substitued on the ninth and tenth carbon atoms with a hydroxyl group and a group selected from the class consisting of amino, methylamino, ethylamino, dimethylamino, diethylamino and phenylamino.

5. Stearic acid substituted on the ninth and tenth carbon atoms with a hydroxyl group and a group selected from the class consisting of amino, methylamino, ethylamino, dimethylamino, diethylamino and phenylamino.

6. Stearic acid substituted on the ninth and tenth carbon atoms with a hydroxyl group and a dimethylamino group.

DANIEL SWERN.
THOMAS W. FINDLEY.

(References on following page)

REFERENCES CITED

The following references are of record in the file of this patent:

UNITED STATES PATENTS

| Number | Name | Date |
|---|---|---|
| 2,089,569 | Orthner et al. | Aug. 10, 1937 |
| 2,160,138 | Gaylor | May 30, 1939 |

FOREIGN PATENTS

| Number | Country | Date |
|---|---|---|
| 639,330 | Germany | Dec. 3, 1936 |

OTHER REFERENCES

Warmbrunn et al.: "Berichte deutsche Chem. Gesell.," vol. 36 (1903), p. 3606.

Jegerow: "Chem. Cent.," 1904, I p. 260.

Beilstein, Band IV, Literature bis Jan., 1910 (1922), Syst. 376, p. 520, No. 7.

Abstract of Klenk-Hoppe Seylers Zeit. Physiol. Chem., vol. 185, p. 169 and p. 177; vol. 198 (1931), p. 25.

Beilstein, vol. 4, second supplement (1942), p. 757.